Oct. 7, 1969 R. S. HUGHES 3,471,719

GATED FILTER AND SAMPLE HOLD CIRCUIT

Filed July 13, 1966

INVENTOR.
RICHARD S. HUGHES

BY

JOHN M. KOCH
ROY MILLER
ATTORNEYS.

United States Patent Office
3,471,719
Patented Oct. 7, 1969

3,471,719

GATED FILTER AND SAMPLE HOLD CIRCUIT

Richard Smith, Hughes, China Lake, Calif., assignor to the United States of America as represented by the Secretary of the Navy Filed July 13, 1966, Ser. No. 565,011
Int. Cl. H03k 17/26
U.S. Cl. 307—293 2 Claims

ABSTRACT OF THE DISCLOSURE

A circuit operable as either a gated filter wherein tne gating signal controls the response time of the filter, or a sample hold to hold the last voltage level applied thereto. When the gating signal is at a low potential, the circuit charges and discharges through a small resistor yielding a fast filter reponse time. When the gating signal is at a high potential, the circuit charges and discharges through a large resistor yielding a slow filter response time. If the resistor through which the filter charges is removed from the circuit, the response time approaches infinity and a sample hold circuit results.

Figures 1, 2:
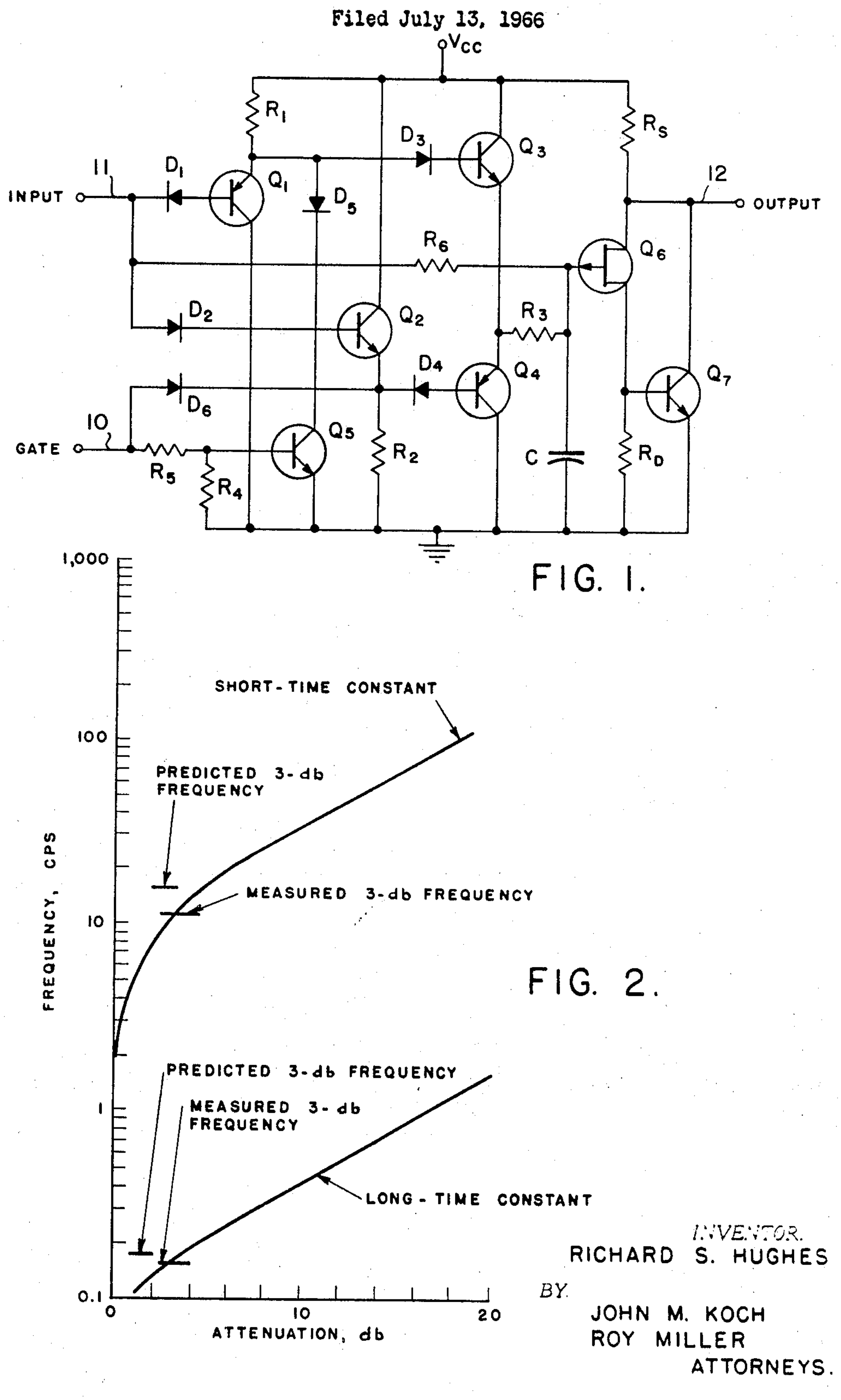

The invention described herein may be manufactured and used by or for the Government of the United States of America for governmental purposes without the payment of any royalties thereon or therefor.

In some applications, such as electronic processing of direction-finding information, tracking information, radar systems, etc., it is desirable to display the information received and to concomitantly slow the rate of such information for display purposes. Also, it sometimes is desired, in such applications, to hold a sample signal for a desired period of time.

Accordingly, it is a principal object of this invention to provide an efficient transistor circuit arrangement for use as a gated filter circuit which can be operated at either of two separate gated filter time constants.

Another object of this invention is to provide a transistorized circuit of simple construction and having a follow-hold feature.

A further object of this invention is to provide such a circuit which has the feature of exhibiting no transient voltages during the gating operation from one time constant to another.

Still another object of this invention is to provide such a circuit that can be used either as a gated filter circuit or as a sample hold circuit.

Additional objects of the invention will become apparent from the following description, which is given primarily for purposes of illustration, and not limitation.

Stated in general terms, the objects of the invention are attained by providing a circuit coupled to a gate signal so that when a gate signal is at a low potential, such as ground potential, a condenser is charged and discharged through a small resistor having a fast filter response time, by two transistors operated in push-pull relationship with respect to the resistor and condenser, and when the gate signal goes to a higher value, the condenser is charged and discharged through a larger resistor having a slow filter response time by the use of a third transistor while the first two transistors are isolated. If the large resistor is removed from the circuit, the filter response time of the circuit approaches infinity and a sample signal hold circuit is attained.

A more detailed description of a specific embodiment of the invention is given below with reference to the accompanying drawing, wherein:

FIGURE 1 is a schematic circuit diagram showing a specific embodiment of the basic gated filter circuit of the invention; and FIG. 2 is a graph illustrating the response of a specific embodiment of the gated filter circuit of FIG. 1.

Normally, the gate 10 is at the lower potential, such as ground potential, and transistor $Q_5$ and diodes $D_5$ and $D_6$, in the basic circuit of FIG. 1, are biased off. Transistors $Q_3$ and $Q_4$ are connected in push-pull relationship to charge and discharge capacitor C. When transistor $Q_3$ is biased on, a charge is "pushed" into capacitor C from input 11 via $D_1$, $Q_1$, $D_3$, $Q_3$ and $R_3$. When transistor $Q_4$ is biased on, the charge is "pulled" from capacitor C to the value of the potential at input 11 via $R_3$, $Q_4$, $D_4$, $Q_2$ and $D_2$. Thus "push-pull" operation of transistors $Q_3$ and $Q_4$ is established. The driving impedance from push-pull transistors $Q_3$ and $Q_4$ is quite small. Consequently, the time constant is due almost entirely to resistor $R_3$ when the resistance of resistor $R_6$ is at least ten times as great as that of resistor $R_3$. The direct current levels at the emitters of push-pull transistors $Q_3$ and $Q_4$ are quite close to the current input level at input 11, since the forward bias voltage across diode $D_1$, $V_{D_1}$, cancels $V_{D_3}$, the base-emitter forward bias voltage of transistor $Q_1$, $V_{BEQ_1}$ cancels $V_{BEQ_3}$, $V_{D_2}$ cancels $V_{D_4}$, and $V_{BEQ_2}$ cancels $V_{BEQ_4}$.

When the gate voltage at 10 goes to a higher value, such as a positive voltage in the present case, transistor $Q_5$ is turned on. This results in driving the voltage at the emitter of transistor $Q_1$, $V_{EQ_1}$ to the lower, ground voltage, thus back-biasing $V_{BEQ3}$, and $V_{EQ2}$ is driven positive, back-biasing $V_{BEQ4}$. Transistors $Q_1$ and $Q_2$ also are turned off. With transistors $Q_1$, $Q_2$, $Q_3$ and $Q_4$ electrically removed from the circuit, capacitor C now is charged and discharged through the much larger resistor $R_6$. Care should be taken to make certain that transistor $Q_6$ looks into a large impedance, at least ten times that of $R_6$, or the output at 12 will not be at a one-to-one ratio with the input at 11, that is, related linearly. Normally, the resistance of resistor $R_3$ is made small for a fast filter response and that of resistor $R_6$ is made large for a slow filter response.

Transistors $Q_6$ and $Q_7$ constitute a high input impedance-low output impedance output amplifier, where having unity gain, so that external circuitry will not affect the charge on capacitor C. The large input impedance is needed to avoid loading resistor $R_6$ or resistor $R_3$. The low output impedance is needed to drive low resistance loads. If the resistance value of resistor $R_6$ is not extremely large, such as about 20K, transistors $Q_6$ and $Q_7$ can be replaced with a conventional Darlington.

FIG. 2 illustrates the operation of the circuit of FIG. 1 while employing the following circuit component values:

| | |
|---|---|
| $Q_1=Q_4=$2N2604 | $R_1=R_2=R_5=R_6=10K$ |
| $Q_2=Q_3=Q_7-$2N929 | $R_3=100\Omega$ |
| $Q_5=$2N916 | $R_4=2K$ |
| $Q_6=$2N2604 | C=100 microfarads |
| All diodes=1N916 | $V_{CC}=+12$ v. |

The basic gated filter circuit of FIG. 1 can be used as a sample hold circuit by removing resistor $R_6$ from the circuit illustrated in FIG. 1. In such case, the filtering time approaches infinity, or a sample hold has been attained. When the gate signal at 10 is at ground level, capacitor C is charged to the input voltage entered at 11. When the gate is turned on, capacitor C will hold its charge. The decay time is dependent upon the resistance of the back-biased base-emitter junctions of the transistors $Q_3$ and $Q_4$ and the back-biased gate-source and gate-drain junctions of transistor $Q_6$.

Obviously, many other modifications and variations of the gated filter and sample hold circuit of the invention are possible in the light of the teachings given hereabove. It is therefore to be understood that the invention may be practiced otherwise than as specifically described and illustrated hereinabove.

What is claimed is:

1. A gated filter circuit which comprises:
(a) a capacitor coupled in the circuit for charging and discharging thereof;
(b) a low resistance coupled to the capacitor;
(c) two transistors coupled to the low resistance and the capacitor for charging and discharging the capacitor in push-pull relationship therewith through the low resistance;
(d) a higher resistance coupled to the capacitor; and
(e) a third transistor coupled to the higher resistance and the capacitor for charging and discharging the capacitor throught he higher resistance while the first two push-pull transistors are isolated from hte circuit.

2. A gated filter circuit according to claim 1, wherein:
(a) diode means are coupled with the third transistor to bias the transistor off when a gate signal is at ground potential so that the capacitor is charged and discharged through the low resistance by the first two transistors in push-pull relationship with the capacitor; and (b) means are connected in the circuit so that when the gate signal goes positive the third transistor is turned on and the first two transistors are isolated from the circuit so that the capacitor is charged and discharged through the higher resistance by the third transistor.

References Cited

UNITED STATES PATENTS

| | | | |
|---|---|---|---|
| 3,165,650 | 1/1965 | White | 307—314 |
| 3,211,926 | 10/1965 | Frysinger | 307—267 |
| 3,259,854 | 7/1966 | Marcus et al. | 307—228 |
| 3,341,696 | 9/1967 | Thaulow | 328—78 |

ARTHUR GAUSS, Primary Examiner

B. P. DAVIS, Assistant Examiner

U.S. Cl. X.R.

307—246, 255, 265